J. M. CALLEJAS Y BECERRA.
APPARATUS FOR CUTTING SUGAR CANE IN THE FIELD.
APPLICATION FILED JULY 9, 1907.
No. 903,666.
Patented Nov. 10, 1908.
6 SHEETS—SHEET 4.
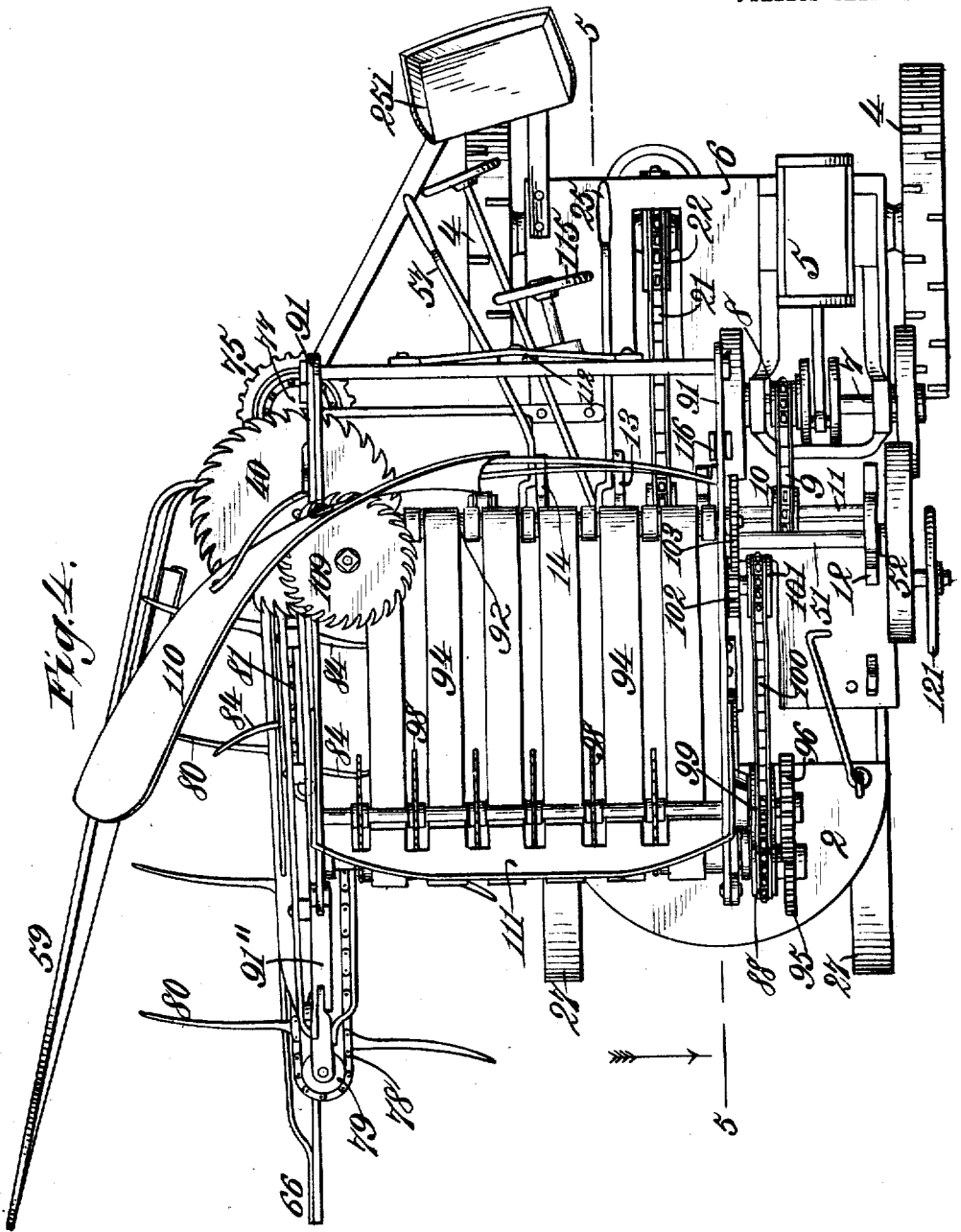
Witnesses:
Inventor:
José M. Callejas y Becerra,
By James L. Norris J. M. CALLEJAS Y BECERRA.
APPARATUS FOR CUTTING SUGAR CANE IN THE FIELD.
APPLICATION FILED JULY 9, 1907.
903,666.
Patented Nov. 10, 1908.
6 SHEETS—SHEET 5.
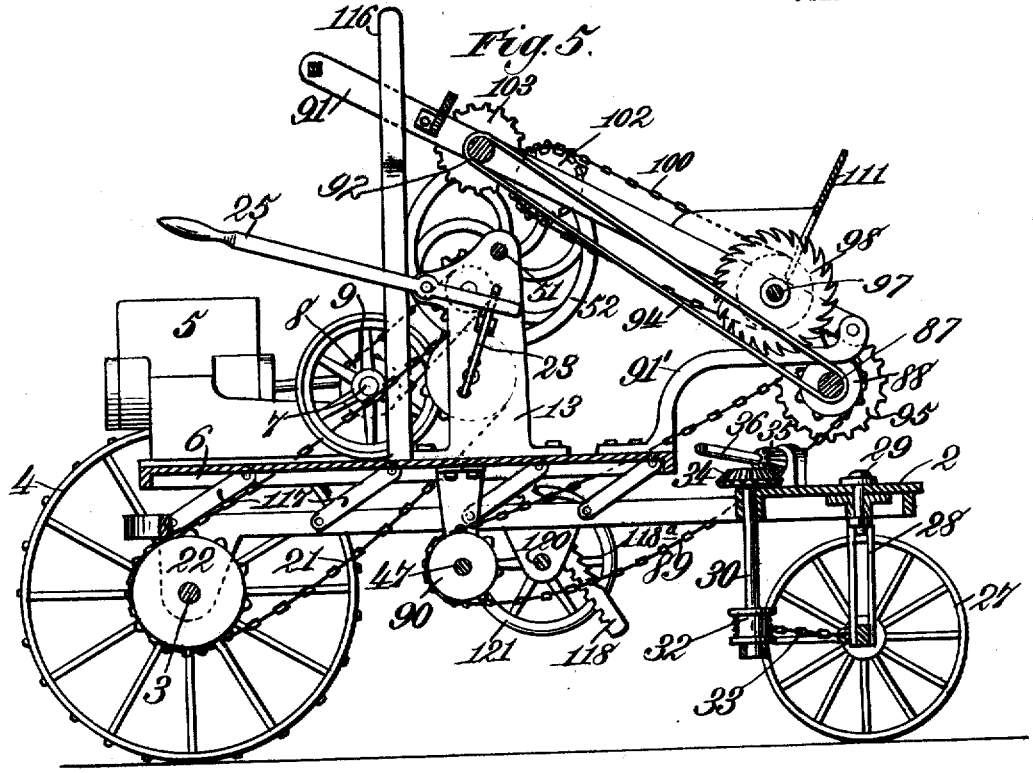
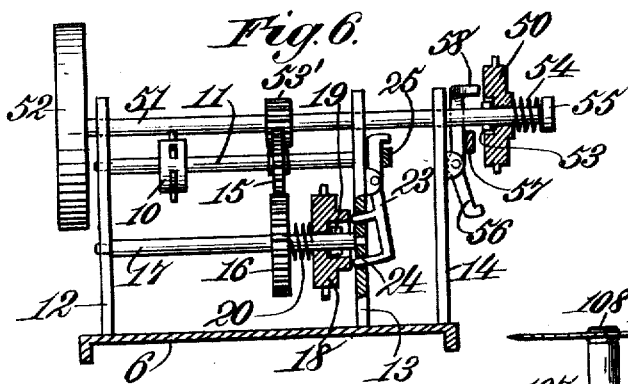
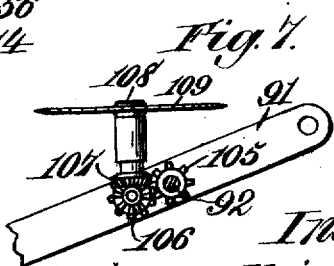
Witnesses.
Inventor:
José M. Callejas y Becerra.
By James L. Norris
Atty.

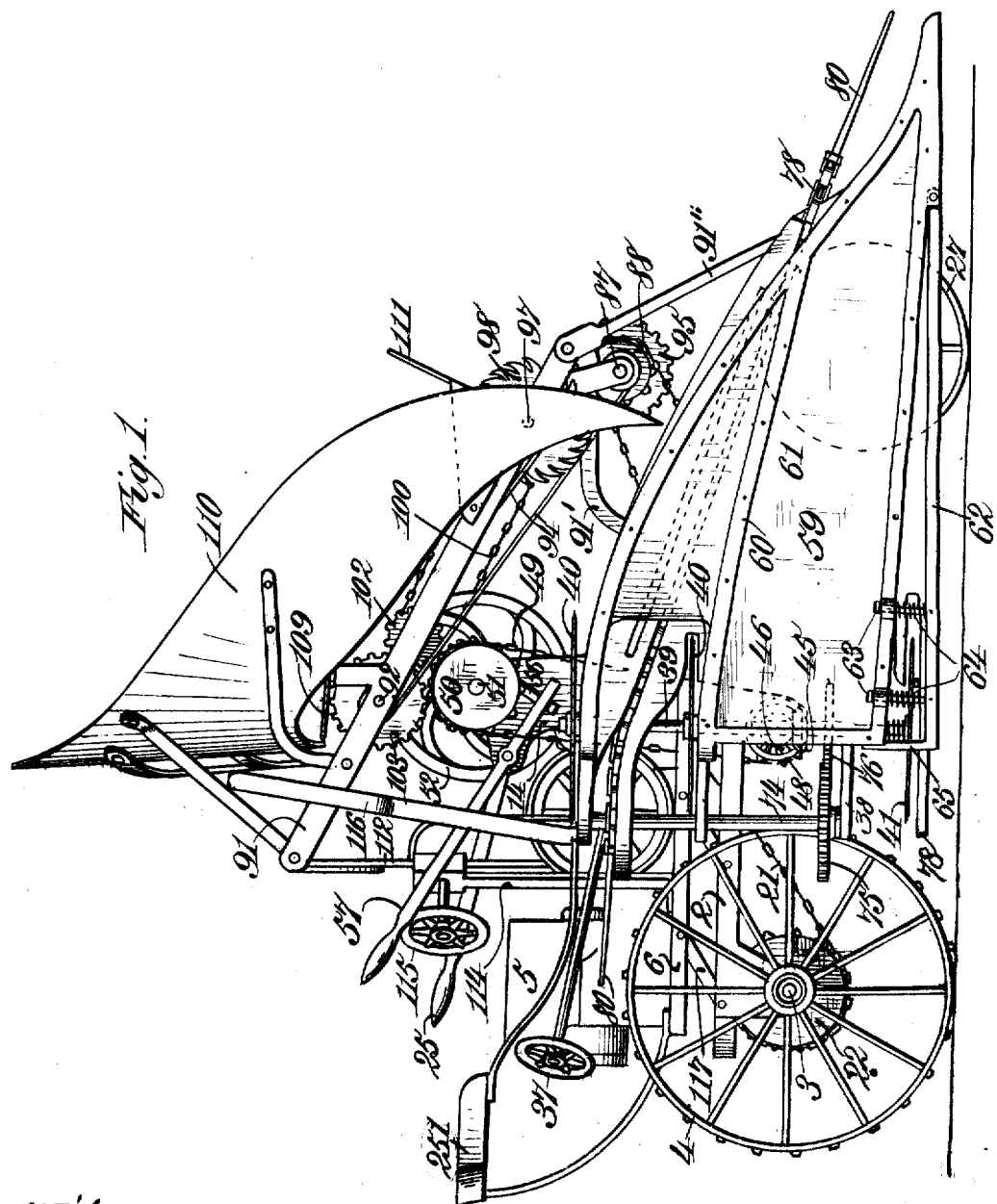

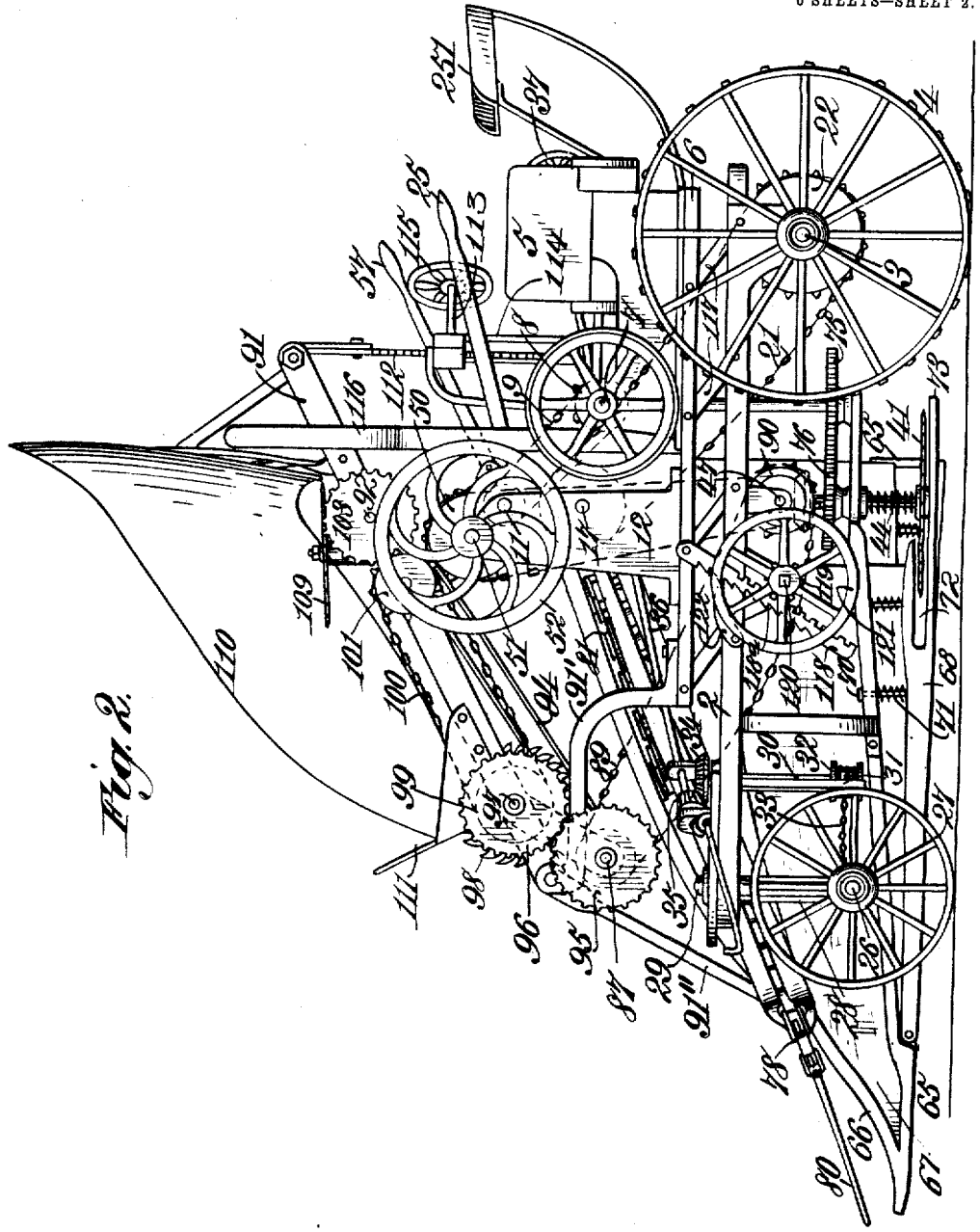

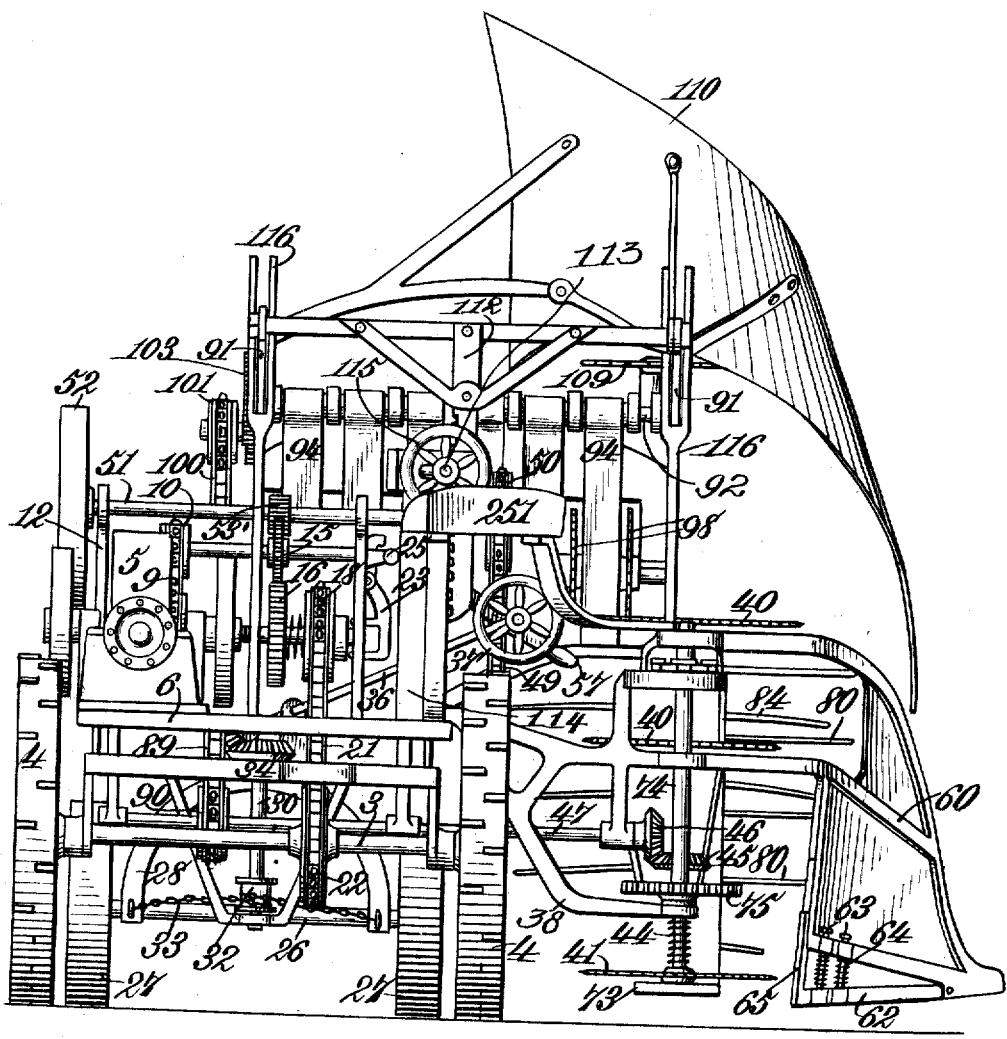

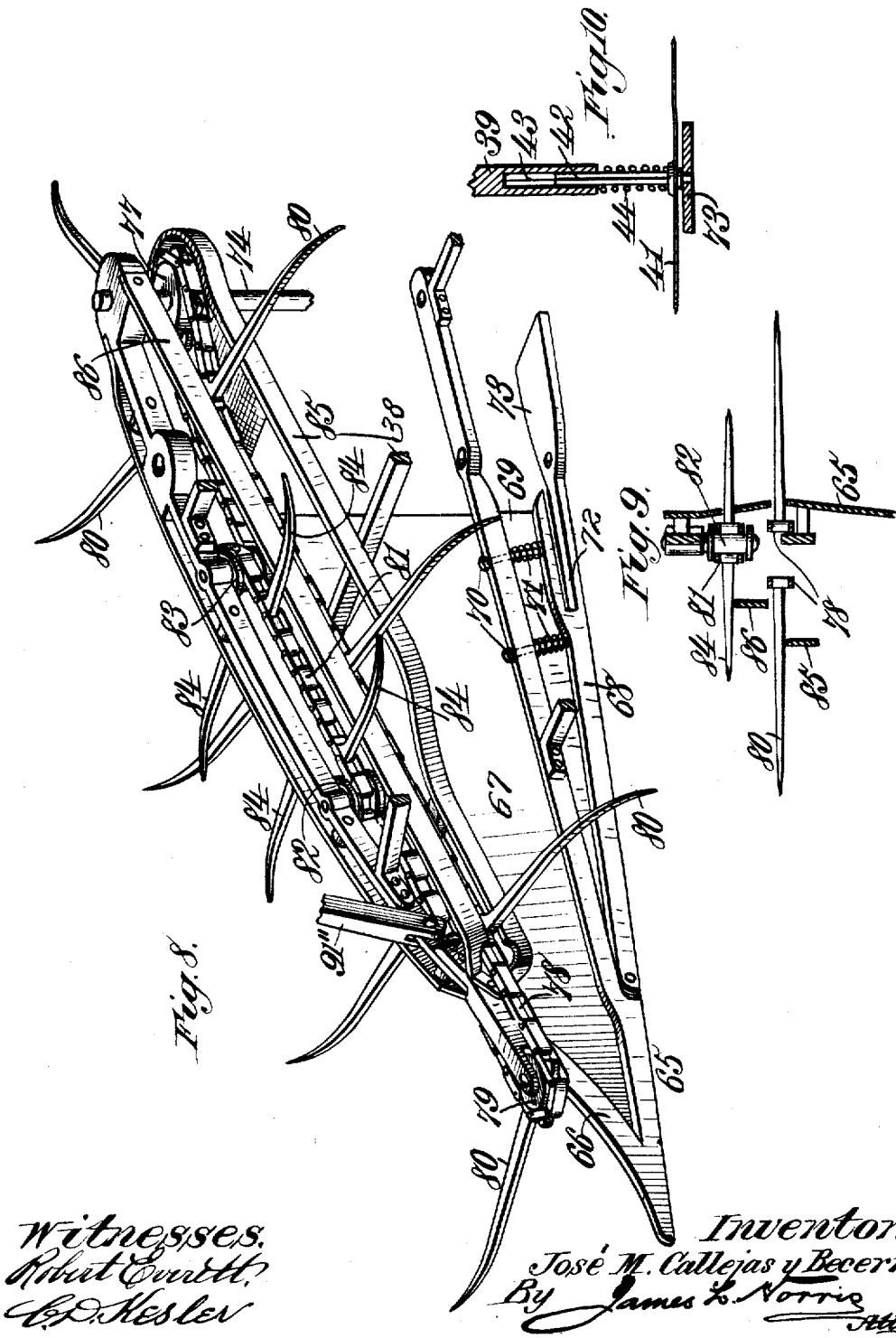

UNITED STATES PATENT OFFICE.

JOSÉ MARIA CALLEJAS Y BECERRA, OF HABANA, CUBA.

APPARATUS FOR CUTTING SUGAR-CANE IN THE FIELD.

No. 903,666.     Specification of Letters Patent.     Patented Nov. 10, 1908.

Application filed July 9, 1907. Serial No. 382,821.

*To all whom it may concern:*

Be it known that I, JOSÉ MARIA CALLEJAS Y BECERRA, a citizen of Cuba, residing at Habana, Cuba, have invented new and useful Improvements in Apparatus for Cutting Sugar-Cane in the Field, of which the following is a specification.

This invention relates to apparatus for cutting sugar cane in the field.

An apparatus involving my invention may be put to several advantageous uses, one of which is that of cutting sugar cane while standing in the field, the apparatus as it is moved across said field serving to cut each stalk of the cane into one or more pieces and being adapted also to separate the leaves and top from the cane and cutting them into small pieces and scattering them through the field, whereby such leaves and top thus cut can be used as fertilizer. The stalk or cane proper which is thus cut up is collected for the extraction of the sugar therefrom or for other purposes. In the present instance the machine is self-propulsive, it carrying a motor of some suitable character under the control of an operator.

In the drawings accompanying and forming a part of this specification I show in full one form of embodiment of the invention which, to enable those skilled in the art to practice the same, will be set forth at length in the following description, while the novelty of the invention will be included in the claims succeeding said description.

Referring to said drawings: Figures 1 and 2 are elevations of the apparatus as seen from opposite sides thereof. Fig. 3 is a rear elevation, and Fig. 4 a top plan view of said apparatus. Fig. 5 is a longitudinal section of the same on the line 5—5 of Fig. 4. Fig. 6 is a sectional detail view of certain clutch mechanism and coöperating parts hereinafter more particularly described. Fig. 7 is a detail view of the top or head cutter, its support and certain adjacent parts. Fig. 8 is a perspective view of the cane gathering means and certain adjunctive devices hereinafter more particularly described. Fig. 9 is a cross-sectional view of the two belts shown in Fig. 8, and certain co-acting elements. Fig. 10 is a detail view in section of the lower cutter and a portion of its supporting shaft.

Like characters refer to like parts throughout the several figures of the drawings.

The different parts of the apparatus are connected with a suitable vehicle such as that shown particularly in Figs. 1 to 5, inclusive, of the drawings, and which embodies in its make-up a suitable body as 2 having bearings of some suitable kind for the rear axle as 3 fixedly carrying traction wheels as 4. The apparatus may be driven in any desirable way, for example by means of a motor as 5 shown conventionally in several of the figures. This motor may as indicated be of any desirable type, although preferably it is operated from some gaseous vapor, such as that generated by gasolene or alcohol. In the present case the motor 5 is sustained by a deck or platform as 6 mounted for vertical adjustment for a purpose that will hereinafter appear. The motor shaft 7 (see Figs. 2 and 5 for example) has fastened thereto a driving member such as the sprocket-wheel 8 (see Fig. 5) connected by a chain as 9, with the sprocket-wheel 10 suitably fastened to the counter-shaft 11 (see Fig. 6) carried by the several uprights 12 and 13 rising from the platform 6. The shaft 11 has fixed thereto a pinion as 15 meshing with a gear as 16 fastened to the shaft 17 carried by the uprights or standards 12 and 13. Loosely carried by the shaft 17 is a wheel 18 shown as being of the sprocket type and which is adapted to be clutched to the shaft 17 by means of the splines or fins 19, the sprocket-wheel being held in driving engagement with the two splines or fins by a coiled spring as 20 surrounding the shaft 19 and bearing against the wheels 16 and 18 respectively. When the sprocket-wheel 18 is moved to the left in Fig. 6 sufficiently to carry it out of engagement with the two splines or fins 19, said wheel 18 will be out of driving connection or working relation with the shaft 17 and hence will not rot. with said shaft, it being clear that, when the splines 19 and sprocket-wheel 18 are in engagement as shown in Fig. 6, said sprocket-wheel will be driven. The sprocket-wheel 18 is connected by a sprocket-chain as 21 with a sprocket-wheel as 22 on the rear axle 3. It therefore follows that, when the sprocket-wheel 18 is clutched to the shaft 17 and when the motor 5 is in operation, the vehicle will be propelled.

The upright or standard 13 is provided on one side thereof (see Fig. 6) with a suitable bearing for the rocking lever 23 fulcrumed between its ends to said bearing, the lower arm of said lever being provided with the laterally-disposed pins or projections 24 extending through perforations in the upright or standard 13 and the free ends of which bear against the sprocket-wheel 18. By swinging the lower arm of the lever 23 to the left in said Fig. 6 sufficiently, the lever, through its fingers or projections 24, will move the sprocket-wheel 18 out of clutching relation with the two splines 9 to thereby unclutch the sprocket-wheel 18 from the shaft 17 and hence stop the motion of the apparatus across a field, assuming, of course, that the motor 5 is in operation. As soon as the lever 23 is freed the spring 20 becomes effective for returning the sprocket-wheel to its normal position, as shown in said Fig. 6, to again propel the apparatus.

A hand-lever as 25 (see Fig. 5 for example) is pivotally connected between its ends to the standard or upright 13, the forward end of said lever being in position for engagement with the lever 23 and the rear end thereof being equipped with a handle within easy reach of the operator controlling the machine and who may occupy a seat as 25¹ suitably connected with the deck or platform 6. Normally the hand-lever 25 will be against the upper branch of the lever 23. When, however, the rear portion of said lever 25 is lifted the forward portion thereof will ride downward along the lever 23 so as to effect the movement of the sprocket-wheel 18 toward the left in Fig. 6, to stop the propulsion of the apparatus. By lowering the rear portion of the said lever 25 such propulsion may be resumed.

The front axle of the vehicle is designated by 26 (see for example Fig. 2) and it carries at its opposite ends wheels as 27 which may be loosely connected with said axle. The axle is rigidly connected with the lower ends of an arch as 28 pivotally connected to the body 2 by a king-bolt as 29, whereby I can provide for steering the apparatus across a field. To the rear of the arch 28 is located a vertically-disposed shaft or spindle as 30 which depends from the body 2 and which is sustained by a suitable bearing or hanger as 31 pendant from said body, as shown clearly in Fig. 3. To the lower end of the shaft 30 is shown as attached a pulley or drum as 32 around which are oppositely wound the chains 33, said chains extending oppositely from the drum or pulley 32 and being connected with the arch 28. To the upper end of the shaft 30 is fastened a beveled gear as 34 in mesh with a beveled pinion as 35 (see Figs. 3 and 5) at the forward end of the shaft 36, said shaft extending upward angularly toward the seat 25 and being equipped at its rear end with a hand-wheel as 37 (see Fig. 1) by turning which the apparatus can be steered through the intermediate connections.

Certain of the operative parts of the apparatus are carried by a framing as 38 projecting outward from one side thereof. In the present case this framing 38 is located at the right side of the apparatus looking toward the front thereof, indicated best in Fig. 3. The framing 38 supports for rotation about a vertical axis the cutter or saw shaft 39. This shaft 39 has fastened thereto two upper cutters as 40. Associated with the shaft 39 is a third cutter as 41 (see Fig. 10). The cutter 41 is fixed to a spindle as 42 which rises therefrom and which, as shown in said Fig. 10, is polygonal in cross section to fit a correspondingly shaped socket as 43 formed in the lower end of the shaft 39. It therefore follows that, when the shaft 39 turns, the cutter 41, by reason of its described connection with said shaft, will turn therewith. Around the spindle 42 is a coiled spring as 44 bearing at its lower end against the cutter 41 and at its upper end against the lower end of the shaft 39, by virtue of which the cutter 41 is yieldingly mounted. This cutter travels in close proximity to the ground, although not directly in contact therewith, as will hereinafter appear. Should an obstruction be met by the cutter it can be elevated thereby without causing any injury and, as soon as the obstruction is passed, the spring 44 placed under compression by the elevation of said cutter will return the latter to its original position. It will be clear that the two cutters 40 and the third cutter 41 rotate in unison as the shaft 39 is turned, and that, as the apparatus is propelled along the ground, these three cutters divide the cane, by which I mean each stalk thereof, into two parts, a fourth cut being made by a cutter hereinafter described, which separates the tops of the stalks therefrom. In other words, each stalk is cut into three parts and the top thereof is separated from the remainder by the several cutters or circular saws.

The shaft 39 is represented as having fastened thereto a beveled gear as 45 (see Fig. 1) in mesh with a beveled gear as 46 at one end of the shaft 47 supported by suitable bearings on the under side of the deck 6 and framing 38 respectively. Said shaft 47 is represented as fixedly carrying a sprocket-wheel as 48 around which is passed a sprocket-chain 49 extending to and around the sprocket-wheel 50 loose on the shaft 51 (see Fig. 6) supported by the standards 12, 13, and 14 and provided at one end with the fly-wheel 52. The shaft 51 is provided with a gear-wheel as 53' meshing with the pinion 15. It will therefore be clear that, when the shaft 11 is driven by the motor 5, the shaft 51, through the intermediate connections, will also be turned so as to rotate the sprocket-wheel 50 provided the same is in clutched relation with the splines or fins as 53 rigid on said shaft 51. The sprocket-wheel 50 is normally held in clutching relation with the splines or fins 53 by a spring as 54 bearing against the collar as 55 on said shaft 51 and also against said sprocket-wheel. The sprocket-wheel 50 is adapted to be moved longitudinally of the shaft 51 to disengage it from the two splines 53 whereby the cutters 40 and 41 may be thrown out of action, and for this purpose a lever as 56 may be provided, said lever being fulcrumed between its ends to the standard 14 and the upper arm or branch thereof being adapted to slide the sprocket-wheel 50 to the right in said Fig. 6, to move the same out of clutching relation wi h said splines or fins 53. For actuating the lever 56 I have shown a hand-lever 57, the forward end of which is adapted to engage the lever 56 for such purpose, while the rear end of said lever 57 is equipped with a handle within easy reach of the operator. By swinging the rear portion of the lever 57 upward, the forward portion thereof rotates along the lower arm of the lever 56 so that the upper arm of the lever 56 can be swung toward the right in said Fig. 6 and cause the finger 58 on said upper arm to slide the sprocket-wheel 50 to the right in said Fig. 6 to carry the sprocket-wheel 50 out of driving relation with the two splines or fins 53 and to compress the spring 54. When the rear portion of the lever 57 is lowered the spring 54 becomes effective to move the sprocket-wheel 50 into clutching relation with the said splines 53. By the manipulation therefore of the hand-lever 57, the cutters or saws 40 and 41 can be thrown into or out of action by starting or stopping the shaft 47. Certain other parts of the apparatus receive their motion, through the intervention of suitable connections, from said shaft 47, so that certain other parts may be also controlled by the hand-lever 57.

The apparatus involves a cane-lifting member such as that denoted in a general way by 59, and said cane-lifting member comprises in the present case an angular frame as 60 and a plate as 61 extending from the front toward but short of the rear of the rearwardly-diverging arms of the said frame 60. The arms of this frame 60 converge substantially to a point at the front end of the cane-lifting member 59, whereby said cane-lifting member is adapted to properly elevate the recumbent stalks. The rear ends of the cane-lifting member 59 are bent inwardly and are rigidly connected with the framing 38 as shown in Figs. 3 and 4. The cane-lifting member 59 is located therefore at one side of the deck or platform 6 and it extends forwardly and outwardly at an angle thereto, and the upper edge of said cane-lifting member, as indicated best in Fig. 2, is disposed upon a rising compound curve toward the rear of the same so as to effectually lift any stalks which may have been broken down or which are upon the ground from any other cause. The frame 60, as shown clearly in Fig. 3, is cut away at its rear end so as to provide for the escape of the pieces of cut cane at such place, and it has pivoted thereto a bar 62 which constitutes that part of the cane-lifting member which travels on the ground, said bar being yieldingly mounted and having connected therewith the headed pins 63 which extend through the lower arm or bar of the frame 60. The pins 63 are surrounded by coiled springs as 64 bearing against the bar 62 and the lower bar or arm of said frame 60 to hold the bar 62 normally in its lowest position. The bar 62 travels along the ground and, should it meet an obstruction, it will be elevated thereby. It might be stated that this bar extends normally at a downward rearward inclination which corresponds with the lower end of the frame 60, as shown best in Fig. 3. The rear end of the bar 62 is shown as provided with a vertical projection 65 which fits a vertical guide channel in the frame 60 to thereby prevent the lateral motion of said bar 62. As the apparatus is propelled along a field the cane-lifting member raises any cane which may be at or near the ground and guides the same into the space between the said member 59 and the complemental member denoted in a general way by 65, as shown best in Fig. 8. The two parts 59 and 65 diverge forward and present collectively a throat or angular passage-way open top and bottom, into which the cane is received as the apparatus moves forward, to be cut by the action of the several cutters, certain of which have been described. The member 65 comprises an acute-angular frame as 66 and a plate as 67 partially covering the frame, the latter being united with the framing 38 in some suitable manner. The throat member 65 extends in the present case parallel with the body 2. There is pivoted to the plate 67 a bar as 68 provided with a plate 69 overlapping the plate 67 so as to present on the outer side of said member 65 a substantially continuous surface. The bar 68 is yieldingly mounted and it has fastened thereto the headed pins 70 extending through a perforation in the lower bar of the frame 66. The pins 70 are surrounded by coiled push-springs 71 bearing against the bar 68 and the lower bar of the frame 66, whereby the bar 68 is yieldingly mounted so as to subserve the same functions performed by the bar 62. The bar 68 has a slot as 72 to receive the horizontally-disposed cutter 41 and it is also provided with a ground runner or blade 73 in which the lower end of the spindle 42 is stepped. The blade 73 travels in contact with or substantially in contact with the ground and both it and the cutter 41 are vertically yieldingly mounted so that they can recede simultaneously when the blade or runner 73 strikes an obstruction or so that they can recede independently should occasion therefor arise. The cutter shaft 39 is supported in part by the frame 66.

As the apparatus is driven across a field by the operation of the motor 5 acting in the manner hereinbefore set forth, the cane-lifting member 59 lifts any recumbent cane and guides it into the space between said member 59 and the throat member 65. The standing cane in front of the throat formed by these two members enters such space as the apparatus moves forward. While in said space or throat the cane is cut by the two cutters 40, the cutter 41, and a third cutter hereinafter described.

The framing 38 and the frame 65 support for rotation the vertically-disposed shaft 74 (see Figs. 1, 3, and 8 for example.) This shaft 74 has fastened to the lower end thereof a gear as 75 meshing with a gear as 76 on the shaft 39 whereby, when the latter is driven, the said cutters will serve to rotate the shaft 74. The shaft 74 is represented as having fastened to the upper end thereof a sprocket-wheel as 77 to receive the sprocket-chain 78 which extends around a sprocket-wheel as 79 lower than the sprocket-wheel 77 and located near and suitably supported by the forward end of the frame 66. The sprocket-belt or chain 78 therefore extends at a downward and forward inclination from the rear thereof. It has attached thereto gathering fingers as 80 which are somewhat curved longitudinally and which are adapted to move longitudinally of the space between or throat formed by the coöperating members 59 and 65 respectively. As the said gathering or bunching fingers 80 travel rearwardly on the motion of the belt or chain 79, they pass through the opening at the rear end of the frame 60, which opening is located between two of the bars of said frame. It will be understood that the operation of said chain 79 is controlled by the hand-lever 57. In addition to said chain 78 the frame 66 carries a second chain or belt as 81 passed around sprocket-wheels as 82 and 83, the shafts of which are supported by said frame 66. The chain 81 is located above and is of the same inclination as the chain 78 and it is provided with fingers as 84 coöperative with the fingers 80 and also longitudinally curved. The chain 78 is positively driven, but the chain 81 is not, although it is moved under the influence of a bunch of stalks when received between one of the fingers 80 and one of the fingers 84 as the outer run of the chain 78 moves rearwardly. The frame 66 is provided with strips 85 and 86 for supporting the two sets of fingers 80 and 84. The latter may be connected to the respective chains 78 and 81 in any desirable manner. The upper chain 81 normally stands at rest. It will be assumed that the different parts of the apparatus are in motion and that the apparatus is being propelled across a field. In such a case as this cane is received between the two members 59 and 65 and several stalks will be brought together by a finger 80 and held thereby as the apparatus moves forward. The bunch of stalks is then engaged by one of the fingers 84 so that there will be two gathering or bunching fingers at opposite sides of the bunch of stalks, and these fingers maintain the stalks in bunch form as the apparatus is moved forward, whereby the cane can be cut by the several cutters. During the motion of the apparatus the chains 78 and 81 move relatively to the apparatus, their fingers coöperating to maintain a bunch of stalks. There will be several bunches of stalks thus formed. The shaft 39 is located forward of the rear end of the lower chain 78 and rearward of the rear end of the upper chain 81 so as to bring the several cutters into proper position to cut the cane.

Supported by suitable bearings at the forward end of the deck or platform 6 is a shaft 87 which carries a sprocket-wheel 88 connected by a chain as 89 with a sprocket-wheel as 90 on the shaft 47 (see Figs. 2 and 5) so that, when the shaft 47 is in motion, the sprocket-wheel 90, sprocket-chain 89, and sprocket-wheel 88 will be driven. The shaft 87 is rotatably carried by the belt-frame 91 supported by a bracket as 91' on the platform 6 and connected with the frame 66 by a link as 91''. The side bars of the said belt-frame 91 are connected together near their rear ends by a shaft as 92 (see Figs. 2 and 3 for example). Around the two shafts 87 and 92 are passed belts as 94 which collectively present an angularly-disposed feed-apron for supplying the tops cut from the stalks to cutting mechanism hereinafter described. The angular position of the several alined belts 94 can be regulated by the adjustment of the frame 91, as will hereinafter appear. It will be evident that, when the shaft 87 is turned by virtue of its connections with the shaft 47, the several belts 94 will be operated to effect the feed of the said tops. The shaft 87 is shown as carrying a gear-wheel 95 at one end thereof, said gear-wheel being in mesh with the gear 96 fastened to the shaft 97 carried by the frame 91 and extending from one side bar to the other thereof. By virtue of the mesh between the two gears 95 and 96 the horizontal shaft 97 can be driven. The shaft 97 has attached thereto several cutters as 98 (see Figs. 2 and 4 for example) and these cutters work in the spaces between the belts 94 slightly above the lower ends of said belts. The shaft 97 has fixed thereto at one end thereof a sprocket-wheel as 99 around which a sprocket-chain as 100 is passed, said sprocket-chain also extending around a sprocket-wheel 101, the shaft of which is carried by the frame 91 and is provided with a gear as 102 (see Fig. 4 for example) in mesh with the gear 103 on the shaft 92 whereby said shaft 92 will be positively driven. In other words, I do not rely upon the belts 94 for driving said upper shaft 92, as the cutter 104 receives its motion from said shaft 92. The shaft 92 carries at one end the spur gear 103 and is provided at the other end with the spur gear 105 (see Fig. 7 for example) meshing with the spur gear 106 having a beveled face which in turn meshes with the beveled gear 107 on the shaft 108 of the cutter 109, said shaft 108 being supported by the angularly-adjustable frame 91. The cutter 109 is complemental to and is located above the two cutters 40 and cutter 41 hereinafter described. These four cutters therefore cut each stalk into three parts and separate the head thereof from the remainder. In the present case the cutter 109 is located slightly forward of the other cutters.

The swinging frame 91 has suitably connected thereto the substantially spirally formed top-directing plate 110 which is extended to a point, as clearly shown in Fig. 1, and this pointed end is located close to the upper compound curved edge of the member 59. The plate 110, as the stalks of cane are received between the members 59 and 65, engages against the tops of the cane so as to swing said tops inward, whereby they can be cut off by the cutter 109 and be directed by the plate 110 on to the several belts 94 which positively convey them to the vertically-disposed cutters 98 which act to cut up the tops into small pieces while said tops are against the arresting plate 111 which is disposed at a slight slant and which extends entirely across the several belts 94. Said arresting plate 111 is slotted to receive the several vertically-disposed cutters 98 and it may be connected with the sides of the swinging-frame 91 in any desirable way. The plate 111 holds the tops a sufficient length of time to insure their being cut up into small parts by the several cutters or circular saws 98, after which the cut pieces drop through the spaces between the belts 94 on to the ground where they are utilized as fertilizer. The cut stalks also drop on to the ground and are subsequently collected. The upper end of the directing plate 110 extends slightly across the transversely alined belts 94 so as to insure the tops cut by the cutter 109 being diverted onto said belts.

To the rear cross-bar of the swinging frame 91 I have shown as fastened a rack-bar 112 which depends from said cross-bar (see Figs. 2 and 3 for example) and the teeth of which are adapted to mesh with a pinion on the shaft 113 substantially horizontally disposed, supported by an upright as 114 on the deck or platform 6, and having a hand-wheel as 115 at its rear end, by turning which said frame 91 can be angularly adjusted through the medium of the intermediate parts. The side bars of the swinging frame are adapted to fit and vertically move in slots in the upper ends of the guide rods as 116 rising from and suitably fastened to the frame-work of the apparatus and by means of which lateral motion of said swinging frame 91 is prevented during the adjustment thereof.

It will be remembered that I have described the deck or platform 6 as being adapted for rising and falling movement. The purpose of this is to elevate the deck 6 should the wheels 4 and 27 sink too deeply into the ground. By virtue of this feature I can, by the adjustment of the deck or platform, provide for the proper relation of the members 59 and 66 to the surface of the earth, and the same statement applies to the other parts, it being understood that all the parts of the apparatus, except the propelling and steering mechanisms, move up and down with said platform or deck. The latter is shown as connected by several parallel links as 117 located at opposite sides thereof, with the body 2 (see Figs. 1 and 2.) To the said deck or platform 6 at one side thereof I pivot the rack-bar 118 (see Fig. 2) the teeth of which mesh with a pinion as 119 on the shaft 120 which carries a hand-wheel 121. By turning this hand-wheel 121 to the right, the rack-bar 118 will be thrust upward and rearward to elevate the platform 6 which is guided and supported during its vertical movement and when in adjusted position by the parallel links 117. The teeth on the bar 118 which mesh with the pinion 119 are at one side of said bar. The bar has on its opposite side teeth as 118$^a$ adapted to be engaged by a pawl as 122 to hold the platform 6 and the parts associated therewith in a vertically adjusted position. By lifting the pawl 122 out of engagement with the teeth 118$^a$ the said platform 6 may be lowered. The pawl 122 is pivoted to the body 2.

As will be understood from what has been initially stated, I do not limit myself to the exact features described and illustrated in detail, such showing and description having been made to enable those skilled in the art to practice the invention and disclosing an advantageous form of embodiment of said invention. It is not essential that sprocket gearing be provided where illustrated and described; other variations as to such and other like features may be adopted within the scope of my claims.

What I claim is:

1. In an apparatus of the class described, a vehicle, means movable with the vehicle and provided with a throat for the reception of cane stalks, and a plurality of superposed cutters to cut through the stalks while said stalks are standing in the field and while they are in said throat.

2. In an apparatus of the class described, a vehicle, two outwardly diverging members associated with the vehicle to present a throat for the reception of cane stalks, and a plurality of superposed cutters to act on the stalks while said stalks are standing in the field and while they are in said throat.

3. In an apparatus of the class described, a vehicle, two members presenting a space for the reception of cane stalks, each of the members having a yieldingly mounted part at the bottom thereof to travel substantially contiguous to the ground, and cutting means to act on the stalks while in said space.

4. In an apparatus of the class described, a vehicle, two outwardly diverging members associated with the vehicle to present a throat for the reception of cane stalks, each of the members having a yieldingly mounted part at the bottom thereof, and cutting means to act on the stalks while in the throat.

5. In an apparatus of the class described, a vehicle, two outwardly diverging members associated with the vehicle to present a throat for the reception of cane stalks, each of the members having a yieldingly mounted part at the bottom thereof, and a plurality of superposed cutters to act on the stalks while in said throat, the lowest cutter being yieldingly mounted.

6. In an apparatus of the class described, a vehicle, two members to present a throat for the reception of cane stalks, one of the members serving as a means for lifting the stalks, means for bunching the stalks while in the throat, and while said stalks are standing in the field and means for cutting through the stalks while thus bunched to separate said stalks into pieces.

7. In an apparatus of the class described, a vehicle, two members presenting a throat for the reception of cane stalks, one of the members serving as a means for lifting the stalks, means for bunching the stalks while in the throat, and means for cutting through the stalks while said stalks are standing in the field and while thus bunched to separate said stalks into pieces.

8. An apparatus of the class described having means for bunching the stalks while standing in the field, and means for cutting the stalks while said stalks are standing in the field and while they are thus bunched.

9. An apparatus of the class described, having means for lifting the stalks, means for bunching the stalks, while said stalks are standing in the field and means for cutting through the stalks while thus bunched to separate them into pieces.

10. An apparatus of the class described having means to bunch cane stalks while standing in the field including a plurality of movable belts provided with coöperative fingers, and means for cutting through the stalks while thus bunched to separate them into pieces.

11. An apparatus of the class described involving a traveling vehicle, two members presenting between them a space for receiving cane stalks, means for bunching the stalks while in said space, and means for cutting through the bunches of the stalks and while said stalks are standing in the field.

12. An apparatus of the class described having a plurality of belts provided with fingers to coöperate for bunching the cane stalks, means for positively operating one of said belts, the other belt being freely movable, and means for cutting through the stalks while thus bunched.

13. An apparatus of the class described comprising a vehicle, means carried by the vehicle and having a throat for the reception of cane stalks, a plurality of belts provided with fingers movable longitudinally of said throat and coöperative for bunching the cane stalks in said throat, means for positively operating one of said belts, the other belt being freely movable, and means operative in the throat to cut the stalks while bunched by said fingers.

14. An apparatus of the class described comprising two outwardly diverging members presenting a throat for the reception of cane stalks, a shaft provided with a plurality of cutters and having a socket, a cutter provided with a yieldingly mounted spindle non-rotatably fitting said socket, the several cutters coöperating to cut the cane stalks while in said throat, and means for rotating said shaft.

15. In an apparatus of the class described, a vehicle, two outwardly diverging members connected with the vehicle to present a throat for the reception of cane stalks, a shaft having cutters to act on the stalks while in said throat, a cutter provided with a spindle yieldingly connected with said shaft and rotative therewith, said spindle being supported by one of said outwardly diverging members, and means for rotating said shaft.

16. In an apparatus of the class described a vehicle, means movable with the vehicle and provided with a throat for the reception of cane stalks, a plurality of superposed cutters to cut through the stalks while said stalks are standing in the field and while they are in said throat, the lowermost of said cutters being yieldingly mounted and the upper of said cutters being located slightly forward of the other cutters, an angularly adjustable frame on said vehicle, a movable apron and cane-top-cutting mechanism supported by said frame, a spirally formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

17. In an apparatus of the class described a vehicle, two outwardly diverging members associating with the vehicle to present a throat for the reception of cane stalks, a plurality of superposed cutters to act on the stalks while said stalks are standing in the field and while they are in said throat, the lowermost of said cutters being yieldingly mounted and the upper of said cutters being located slightly forward of the other cutters, an angularly adjustable frame on said vehicle, a movable apron and cane-top-cutting mechanism supported by said frame, a spirally formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

18. In an apparatus of the class described, a vehicle, two outwardly diverging members associating with the vehicle connected at their rear end and presenting a throat for the reception of cane stalks, one of said members serving as a lifting device for the stalks, a plurality of cutters to cut through the stalks while said stalks are standing in the field and while they are in said throat, said throat being open below the cutters to permit the stalks to fall on the ground after being cut, the lowermost of said cutters being yieldingly mounted and the upper of said cutters being located slightly forward of the other cutters, an angularly adjustable frame on said vehicle, a movable apron and cane-top-cutting mechanism supported by said frame, a spirally-formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

19. In an apparatus of the class described, a vehicle, two members presenting a space for the reception of cane stalks and constituting a throat, each of said members having a yielding part at the bottom thereof to travel substantially contiguous to the ground, a plurality of superposed cutters to cut through the stalks while said stalks are standing in the field and while they are in said throat, the lowermost of said cutters being yieldingly mounted and the upper of said cutters being located slightly forward of the other cutters, an angularly adjustable frame on said vehicle, a movable apron and cane-top-cutting mechanism supported by said frame, a spirally formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

20. In an apparatus of the class described, a vehicle, two members to present a throat for the reception of cane stalks, one of the members serving as a means for lifting the stalks, means for bunching the stalks while in the throat while said stalks are standing in the field, a plurality of superposed cutters for cutting through the stalks while thus bunched to sever the stalks into pieces, the lowermost of said cutters being yieldingly mounted and the upper of said cutters being located slightly forward of the other cutters, an angularly adjustable frame on said vehicle, a movable apron and cane-top-cutting mechanism supported by said frame, a spirally formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

21. An apparatus of the character described comprising a vehicle, means carried by the vehicle and having a throat for the reception of cane stalks, a plurality of belts provided with fingers moving longitudinally of said throat and coöperative for bunching the cane stalks in said throat, means for positively operating one of said belts, the other belt being freely movable, a plurality of superposed cutters to cut through the stalks while bunched by said fingers, the lowermost of said cutters being yieldingly mounted and the upper of said cutters being located slightly forward of the other cutters, an angularly adjustable frame on said vehicle, a movable apron and cane-top-cutting mechanism supported by said frame, a spirally formed cane top directing plate carried by the frame and adapted to swing the tops of the cane stalks while standing in the throat inwardly towards the upper of said cutters, whereby the tops of the stalks will be severed, the other of said cutters severing the stalks below the top, said plate further directing the severed cane tops upon said apron to be acted on by the cane-top-cutting mechanism, and means for arresting the cane tops to hold them under the action of the cane-top-cutting mechanism.

In testimony whereof I have hereunto set my hand in presence of two subscribing witnesses.

JOSÉ MARIA CALLEJAS Y BECERRA.

Witnesses:
 RUTLEDGE WILLSON,
 JAMES L. NORRIS, Jr.